United States Patent
Mikami et al.

[11] Patent Number: 6,151,455
[45] Date of Patent: Nov. 21, 2000

[54] LENS-FITTED PHOTO FILM UNIT WITH FLASH DEVICE AND PROTECTIVE COVER

[75] Inventors: Yuji Mikami; Nobuyuki Kameyama, both of Kanagawa, Japan

[73] Assignee: Fuji Photo Film Co., Ltd., Kanagawa, Japan

[21] Appl. No.: 09/326,708

[22] Filed: Jun. 7, 1999

[30] Foreign Application Priority Data

Jul. 10, 1998 [JP] Japan ................................ 10-196209

[51] Int. Cl.[7] .............................. G03B 7/26; G03B 17/00
[52] U.S. Cl. ........................... 396/205; 396/448; 396/543
[58] Field of Search .................................. 396/155, 205, 396/206, 439, 448, 535, 543

[56] References Cited

U.S. PATENT DOCUMENTS

| | | | |
|---|---|---|---|
| 4,264,172 | 4/1981 | Miyagawa et al. | 396/448 |
| 4,319,818 | 3/1982 | Sawara | 396/205 |
| 5,608,478 | 3/1997 | Kamoda | 396/448 |
| 5,765,068 | 6/1998 | Kamoda | 396/448 |
| 5,895,136 | 4/1999 | Grant et al. | 396/448 |
| 5,943,521 | 8/1999 | Lamphorn et al. | 396/448 |

*Primary Examiner*—Eddie C. Lee
*Attorney, Agent, or Firm*—Young & Thompson

[57] ABSTRACT

A protective cover has an arm extending toward a flash switch operation member, and a cam follower pin is formed on a free end of the arm. A flash switch knob, a shifting cam groove and a locking cam groove are formed integrally on a switch plate. When the protective cover is opened, the cam follower pin slides along the shifting cam groove, causing the flash switch knob to move to an ON position, turning on a flash switch of a flash device. In the open position of the protective cover, the cam follower pin is disengaged from the shifting cam groove, allowing the flash switch knob to move to an OFF position. When the protective cover is closed while the flash operation member is in the ON position, the cam follower pin slides along the shifting cam groove into a locking cam groove, causing the flash switch knob to move to the OFF position. While the cam follower pin is in the locking cam groove, the flash switch knob is locked in the OFF position. When the protective cover is closed while the flash operation member is in the OFF position, the cam follower pin slides along a guide cam surface formed above the shifting cam groove, and is guided into the locking cam groove.

6 Claims, 8 Drawing Sheets

LENS-FITTED PHOTO FILM UNIT WITH FLASH DEVICE AND PROTECTIVE COVER

BACKGROUND OF THE INVENTION

1. Field of the Invention

The present invention relates to a lens-fitted photo film unit with a flash device and a protective cover movable between a closed position covering the taking lens and an open position uncovering the taking lens.

2. Background Arts

A lens-fitted photo film unit is widely known as a device, which is provided with a simple exposure mechanism and is loaded with an unexposed photo film cartridge in the factory, so that anyone can enjoy photography without bothering about loading and rewinding the film. Hereinafter, the lens-fitted photo film unit will be referred to as a film unit.

A film unit with a flash device is known in the art. One type of flash device is provided with a flash charge button that is pushed to charge a main capacitor of the flash device. The flash charge button resiliently returns to an OFF position, so the photographer should continue to push the button till an indicator lamp indicates that the flash device is fully charged. Another type flash device has a flash switch operation member that is slidable between an ON position and an OFF position. Once the flash switch operation member is set to the ON position, a flash device built in the film unit is automatically charged up to a set voltage and maintained charged unless the flash switch operation member is reset to the OFF position. Therefore, it is unnecessary to keep on pushing the flash charge button till the flash device is charged up. However, if the photographer forgets to turn off the flash switch, the flash device continues to be charged and consumes a power source battery wastefully.

To improve the portability, the film unit has been made smaller and more compact. Indeed the small film unit is superior in portability, but the taking lens of the film unit tends to be stained as it is exposed all the time. Also, the photographer is more likely to touch the taking lens unconsciously. Accordingly, it is desirable to provide the film unit with a protective cover.

However, to make a flash photography, the photographer has to turn on the flash switch after opening the protective cover. The photographer is more likely to forget turning on the flash switch when to make a flash photography, or close the protective cover without turning off the flash switch when it is the slidable switch.

Japanese Utility Model Laid-open Application No. 60-60736 discloses a camera with a protective cover that is slidable between a closed position covering the taking lens and an open position uncovering the taking lens. The protective cover has an opening that is placed in front of a flash projector to expose the flash projector when the protective cover is moved in the open position. Also when the protective cover is moved in the open position, a flash switch is automatically turned on. Thus, the photographer never forget turning on the flash switch.

Since the flash switch is automatically turned off by moving the protective cover in the closed position, the camera of the above mentioned publication prevents the photographer from forgetting to turn off the flash switch and thus saves batteries. However, as the flash switch is maintained ON so long as the protective cover is in the open position, this camera cannot take a photograph without flash.

SUMMARY OF THE INVENTION

In view of the foregoing, an object of the present invention is to provide a film unit with a protective cover, wherein a flash switch is turned off by closing the protective cover, and is turned on by opening the protective cover, but the photographer can chose between a flash photography and a non-flash photography in the open position of the protective cover.

According to the present invention, a lens-fitted photo film unit having a flash unit incorporated therein is provided with a protective cover movable between a closed position covering a taking lens and an open position uncovering the taking lens; a switch operation member manually operable between an ON position for turning on a flash switch to start charging a main capacitor of the flash unit and an OFF position for turning off the flash switch to terminate charging the main capacitor; and an interconnection device between the protective cover and the switch operation member, the interconnection device causes the switch operation member to move from the OFF position to the ON position in cooperation with the protective cover moving to the open position, allows the switch operation member to be moved between the ON position and the OFF position when the protective cover is in the open position, causes the switch operation member to move from the ON position to the OFF position in cooperation with the protective cover moving to the closed position, and prevents the switch operation member from being moved to the ON position when the protective cover is in the closed position.

Because the flash switch operation member is forcibly moved from the ON position to the OFF position by moving the protective cover to the closed position, wasteful consumption of batteries by forgetting to turn off the flash switch is prevented. Since the flash switch operation member is prevented from being moved to the ON position when the protective cover is in the closed position, it makes sure to avoid wasting batteries by unconsciously turning on the flash switch. Because the flash switch operation member is moved from the OFF position to the ON position as the protective cover is moved to the open position, the photographer does not need to turn on the flash switch after opening the protective cover. When the protective cover is in the open position, the flash switch operation member is allowed to move to the OFF position, so it is possible to choose a non-flash photography.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 1 is a perspective view of a film unit according to a first embodiment of the invention, with its protective cover open and its flash switch ON;

FIG. 8 is a perspective view of the film unit of FIG. 7, with its protective cover open and its flash switch ON;

DETAILED DESCRIPTION OF THE PREFERRED EMBODIMENT

Figure 1:
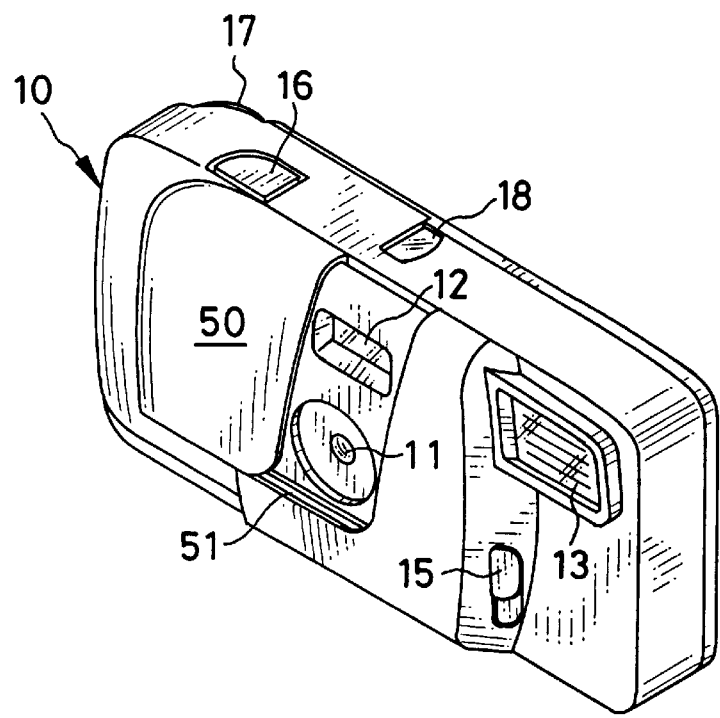

In FIG. 1, a film unit 10 is provided with a taking lens 11, a finder objective window 12, a flash projector 13, a flash switch knob 15, a shutter button 16, a film winding wheel 17, and a frame counter window 18.

Figure 2:
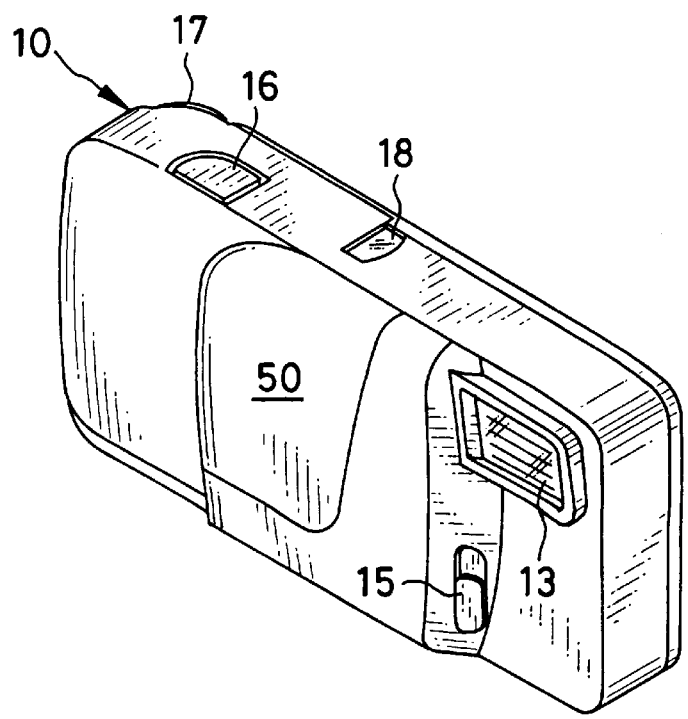
FIG. 2 is a perspective view of the film unit of FIG. 1, with its protective cover closed and its flash switch OFF.

A protective cover 50 for protecting the taking lens 11 is provided on a front side of the film unit 10, so as to be slidable in a horizontal direction of the film unit 10 between a closed position as shown in FIG. 2, covering the taking lens 11 and the finder objective window 12 and an open position as shown in FIG. 1, uncovering these elements 11 and 12.

Figure 3:
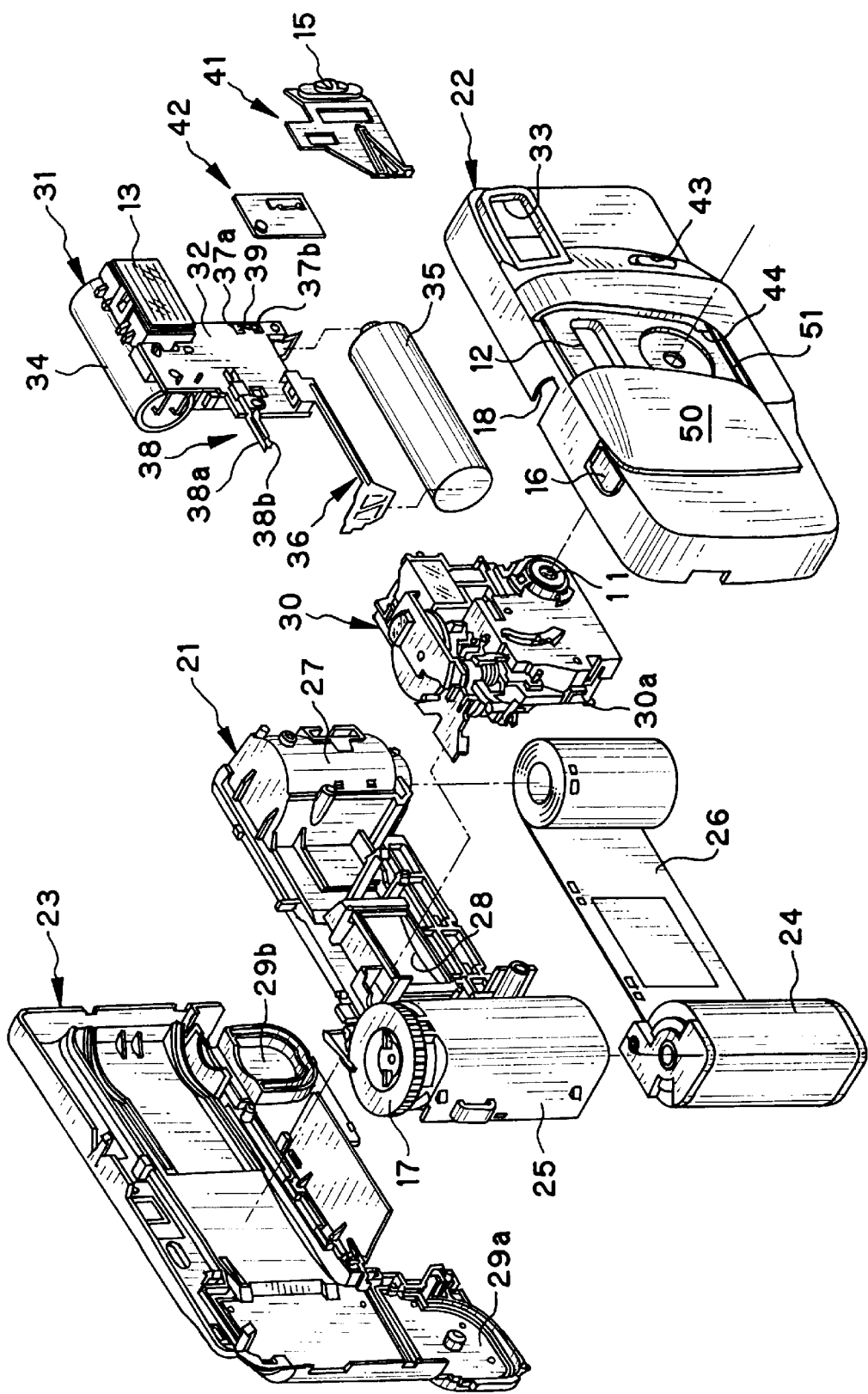
FIG. 3 is an exploded view of the film unit of FIG. 1.

As shown in FIG. 3, the film unit 10 is constituted of a basic portion 21, a front cover 22, a rear cover 23, an exposure unit 30, and a flash unit 31.

The basic portion 21 has a cartridge chamber 25 and a film roll chamber 27 formed integrally therewith, for holding a cartridge shell 24 and a roll of unexposed filmstrip 26 respectively therein. These chambers 25 and 27 have open rear sides which are closed by the rear cover 23 in a light-tight fashion, after the cartridge shell 24 and the photo filmstrip 26 are loaded. Bottom sides of the cartridge chamber 25 and the film roll chamber 27 are also open, and are closed by bottom lids 29a and 29b which are formed integrally with the rear cover 23.

An exposure aperture 28 is formed through the basic portion 21 in between the cartridge chamber 25 and the film roll chamber 27. The exposure unit 30 is attached to the front of the exposure aperture 28. The exposure unit 30 is an assembly, wherein those members necessary for exposure are integrally mounted to a base portion 30a, including a shutter charging mechanism, a shutter mechanism, a film winding-stopping mechanism, a frame counter mechanism, and a finder optical system.

The flash unit 31 is an assembly wherein flash circuit elements are formed on a flash circuit board 32 on which, and the flash projector 13, a main capacitor 34, a battery holder 36 for holding and connecting a battery 35 to the flash circuit, and a triggering switch 38 are mounted to the flash circuit board 32. The flash unit 31 is attached to the front of the film roll chamber 27. The flash projector 13 is exposed to the front of the film unit 10 through a flash window 33 that is formed through the front cover 22. The triggering switch 38 consists of a pair of contact strips 38a and 38b. The contact strips 38a and 38b are brought into contact each other to turn on the triggering switch when the shutter mechanism is released by pressing the shutter button 16. Also, a pair of contact chips 37a and 37b and a resilient contact plate 39, which constitute a flash switch, are mounted on the flash circuit board 32.

Figure 4:
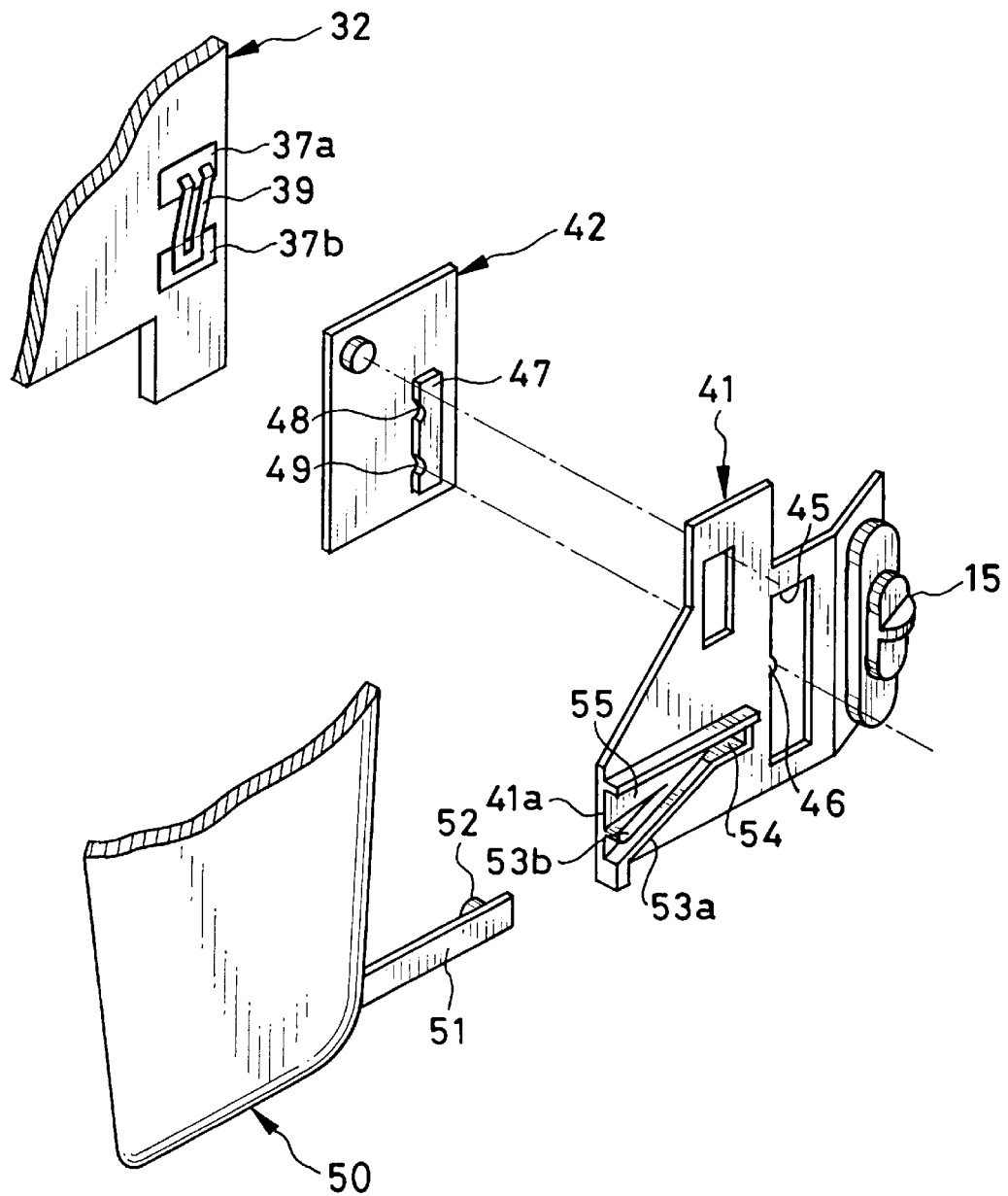
FIG. 4 is an exploded fragmentary view illustrating an interconnection mechanism between the protective cover and the flash switch operation member of the film unit of FIG. 1.
Figure 5A:
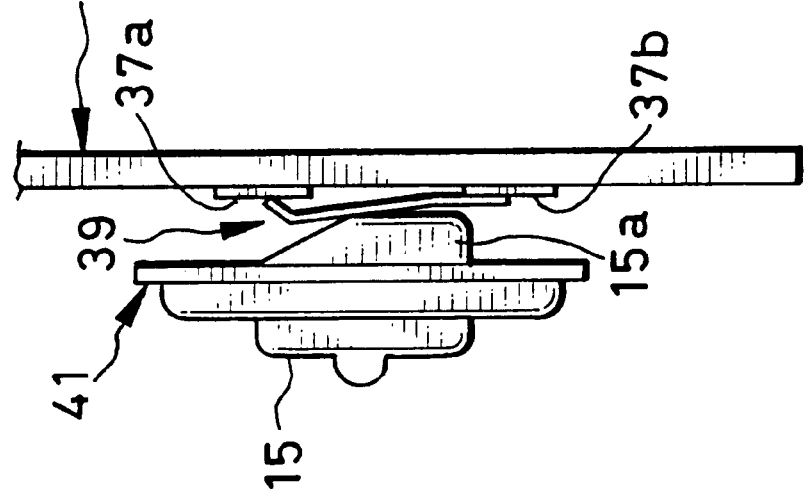
FIGS. 5A, and 5B are explanatory views illustrating operations of the interconnection mechanism.
Figure 5B:
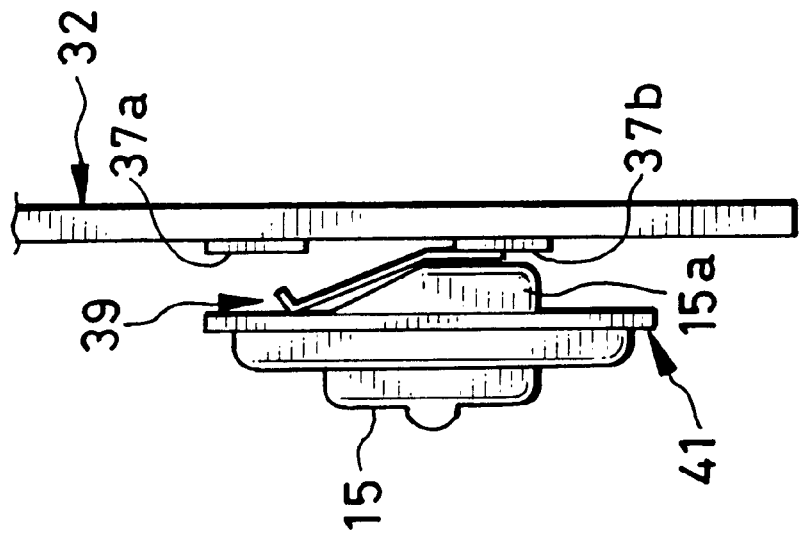

As shown in FIG. 4, the contact plate 39 is secured to the lower contact chip 37b, and the flash switch knob 15 is located in front of the contact plate 39. As shown in FIGS. 5A and 5B, a projection 15a formed on the back of the flash switch knob 15. When the flash switch knob 15 is moved upward, the contact plate 39 is pushed by the projection 15a, and is brought into contact with the upper contact chip 37a, turning on the flash switch. When the flash switch knob 15 is moved downward, the projection 15a does not push the contact plate 39, so the contact plate 39 resiliently moves off the contact chip 37a, turning off the flash switch.

When the flash switch is turned on, the main capacitor 34 starts being charged up to a set voltage. When the triggering switch 38 is turned on after the main capacitor 34 is charged up, the flash projector 13 emits light. So long as the flash switch is on, the flash unit 31 repeats charging the main capacitor 34 up to the set voltage each time the voltage charged across the main capacitor 34 goes below the set value. When the flash switch is turned off, the flash unit 31 stops charging. So long as the flash switch is OFF, and the flash projector 13 does not fire even when the triggering switch 38 is turned on.

As shown in FIG. 4, the flash switch knob 15 is formed integrally on a switch plate 41. The switch plate 41 is mounted on a supporting plate 42 so as to be slidable up and down, and the flash switch knob 15 is protruded out through an opening 43 of the front cover 22. The switch plate 41 and the switch supporting plate 42 are held between the flash circuit board 32 and the front cover 22. The switch supporting plate 42 is positioned on the flash circuit board 32 by a positioning pin or the like.

The switch plate 41 is provided with an opening 45 that has a clicking protuberance 46 formed on its vertical edge in correspondence with the clicking protuberance 46. The opening 45 is fitted on a stepped portion 47 of the switch supporting plate 42. The stepped portion 47 has two clicking notches 48 and 49 formed in its vertical edge. The switch plate 41 is held in an upper position or in a lower position as the clicking protuberance 46 clicks in the upper clicking notch 48 or in the lower clicking notch 49. The upper position of the switch plate 41 is an ON position of the flash switch knob 15 to turn on the flash switch, whereas the lower position of the switch plate 41 is an OFF position of the flash switch knob 15 to turn off the flash switch.

The protective cover 50 has an arm 51 that protrudes toward the flash switch knob 15. The arm 51 is made resilient, and inserted through an opening 44 of the front cover 22 (see FIG. 3) into between the front cover 22 and the switch plate 41. As shown in FIG. 4, the arm 51 has a cam follower pin 52 on the back side of its free end, whereas the switch plate 41 has cam portions formed integrally on the front surface thereof. As shown in detail in FIGS. 6A and 6B, the cam portions consist of a shifting cam groove 53, a locking cam groove 54 and a guide cam surface 55. The shifting cam groove 53 is defined by guide rails 53a and 53b that extend aslant to the horizontal direction of the film unit 10. An upper terminal of the shifting cam groove 53 continues to the locking cam groove 54 that extends in the horizontal direction. A lower terminal of the shifting cam groove 53 is not closed but continues to a side edge 41a of the switch plate 41, to accept the cam follower pin 52 of the arm 51. The guide cam surface 55 extends above the shifting cam groove 53. The guide cam surface 55 has the same height as the shifting cam groove 53 relative to a backside surface of the switch plate 41 at the side edge 41a of the switch plate 41, and slopes to reach the height of the upper guide rail 53b at a border to the locking cam groove 54. That is, to form the guide cam surface 55, the thickness of the switch plate 41 is increased from the side edge 41a to the border to the locking cam groove 54.

Figure 6A:
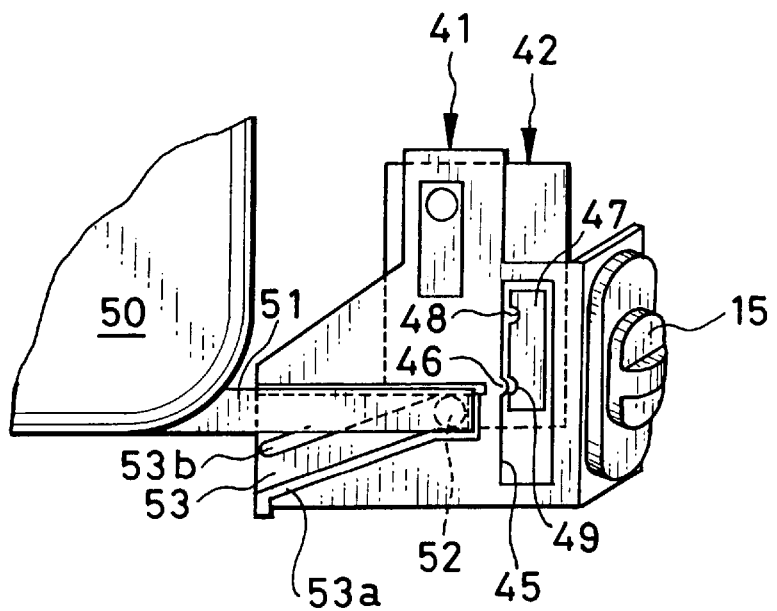
FIGS. 6A and 6B are explanatory views illustrating an operation of the flash switch operation member.
Figure 6B:
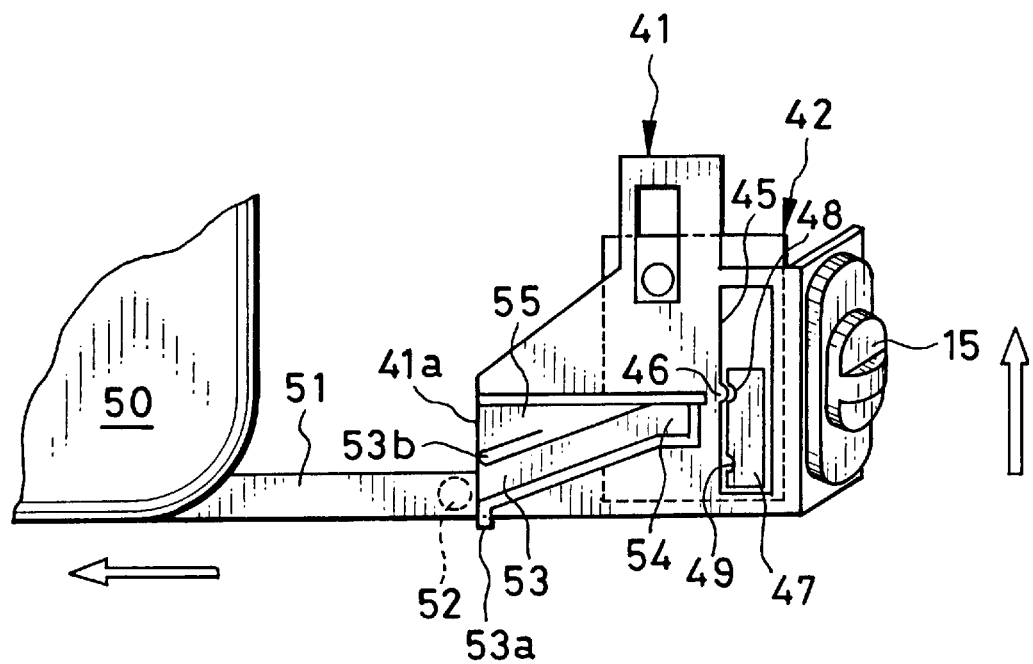

When the protective cover 50 is in the closed position, the cam follower pin 52 is engaged in the locking cam groove 54, as shown in FIG. 6A. In this position, the clicking protuberance 46 of switch plate 41 clicks in the lower click notch 49, and the flash switch knob 15 is in the OFF position. So long as the cam follower pin 52 is engaged in the locking cam groove 54, the flash switch knob 15 is locked in the OFF position. As the protective cover 50 moves to the open position, the cam follower pin 52 moves from the locking cam groove 54 to the shifting cam groove 53. As the cam follower pin 52 moves along the shifting cam groove 53 toward the side edge 41a of the switch plate 41, the cam follower pin 52 pushes up the switch plate 41. When the protective cover 50 reaches the open position, the clicking protuberance 46 clicks in the upper click notch 48, positioning the flash switch knob 15 in the ON position. Since the flash switch is automatically turned on by opening the protective cover 50, the photographer needs not operate the flash switch knob 15 after opening the protective cover 50.

Where the protective cover 50 is in the open position, the cam follower pin 52 is disengaged from the shifting cam groove 53, so the switch plate 41 is allowed to move up and down. Therefore, the photographer may slide the flash switch knob 15 to the OFF position to take a non-flash photography. If the photographer wishes to take a flash photography again, the photographer has only to slide the flash switch knob 15 up to the ON position. In either case, the protective cover 50 in the open position is not affected by the switching operation of the flash switch knob 15.

To conclude the photography, the protective cover 50 is moved to the closed position. If the flash switch knob 15 is in the ON position at that time, the cam follower pin 52 is engaged in the shifting cam groove 53. As the protective cover 50 moves to the closed position, the cam follower pin 52 moves along the shifting cam groove 53 toward the locking cam groove 54, thereby pushing the switch plate 41 downward. When the protective cover 50 reaches the closed position, the cam follower pin 52 is engaged in the locking cam groove 54, and the clicking protuberance 46 clicks in the lower click notch 49, locking the flash switch knob 15 in the OFF position.

Since the flash switch knob 15 is automatically moved to the OFF position by closing the protective cover 50, the photographer does not forget to turn off the flash switch. Thus, the wasteful consumption of the battery 35 is reduced to the minimum at the conclusion of the photography.

If, on the other hand, the flash switch knob 15 is in the OFF position when the protective cover 50 is being closed, the cam follower pin 52 moves on the guide cam surface 55 toward the locking cam groove 54, while the arm 51 is bent resiliently due to the slope of the surface 55, i.e., the increasing thickness of the switch plate 41. Immediately before the protective cover 50 reaches the closed position, the cam follower pin 52 rides over the border of the guide cam surface 55 and drops into the upper terminal of the shifting cam groove 53. When the protective cover 50 reaches the closed position, the cam follower pin 52 reaches the locking cam groove 54. Therefore, it is unnecessary to set the flash switch knob 15 to the ON position before closing the protective cover 50.

Figure 7:
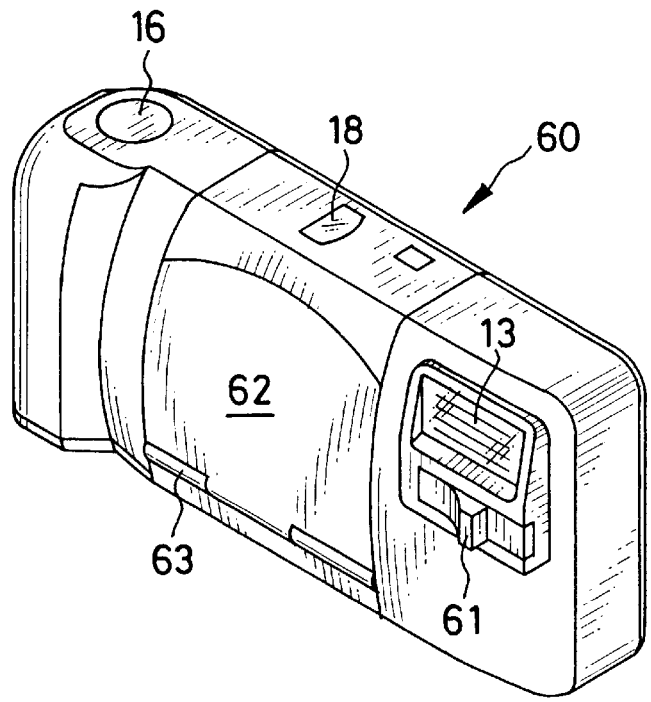
FIG. 7 is a perspective view of a film unit according to a second embodiment of the invention, with its protective cover closed and its flash switch OFF.
Figure 8:
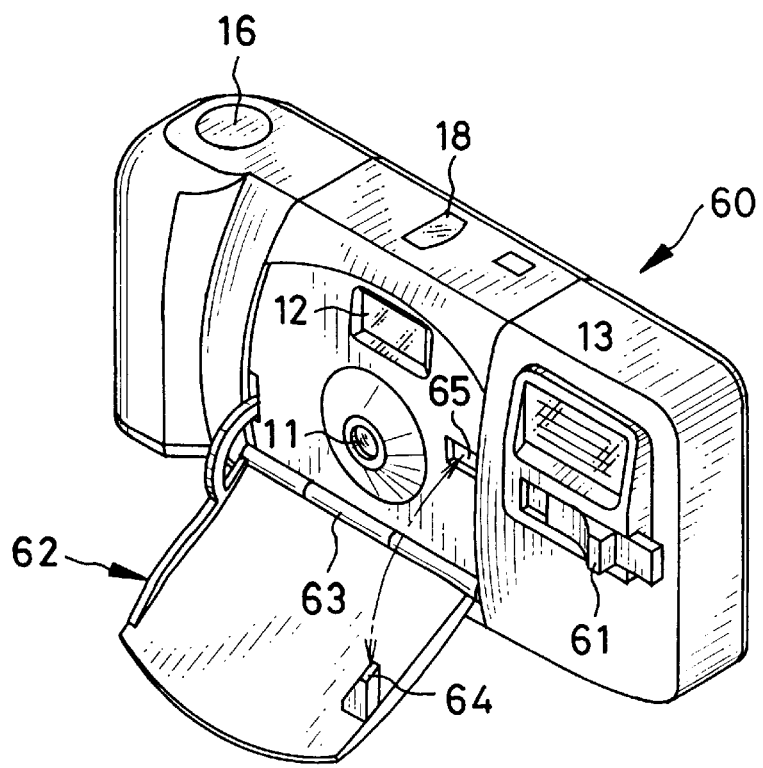

FIG. 7 shows a film unit 60 according to a second embodiment, wherein a flash switch knob 61 is slidable in a horizontal direction of the film unit 60, and a protective cover 62 is mounted to a middle area of a front cover 66 of the film unit 60 through a hinge 63. A rotational axis of the hinge 23 extends in the horizontal direction of the film unit 60, so the protective cover 62 flaps up and down between a closed position covering a taking lens 11 and a finder objective window 12, as shown in FIG. 7, and an open position uncovering these elements 11 and 12, as shown in FIG. 8.

Figure 9:
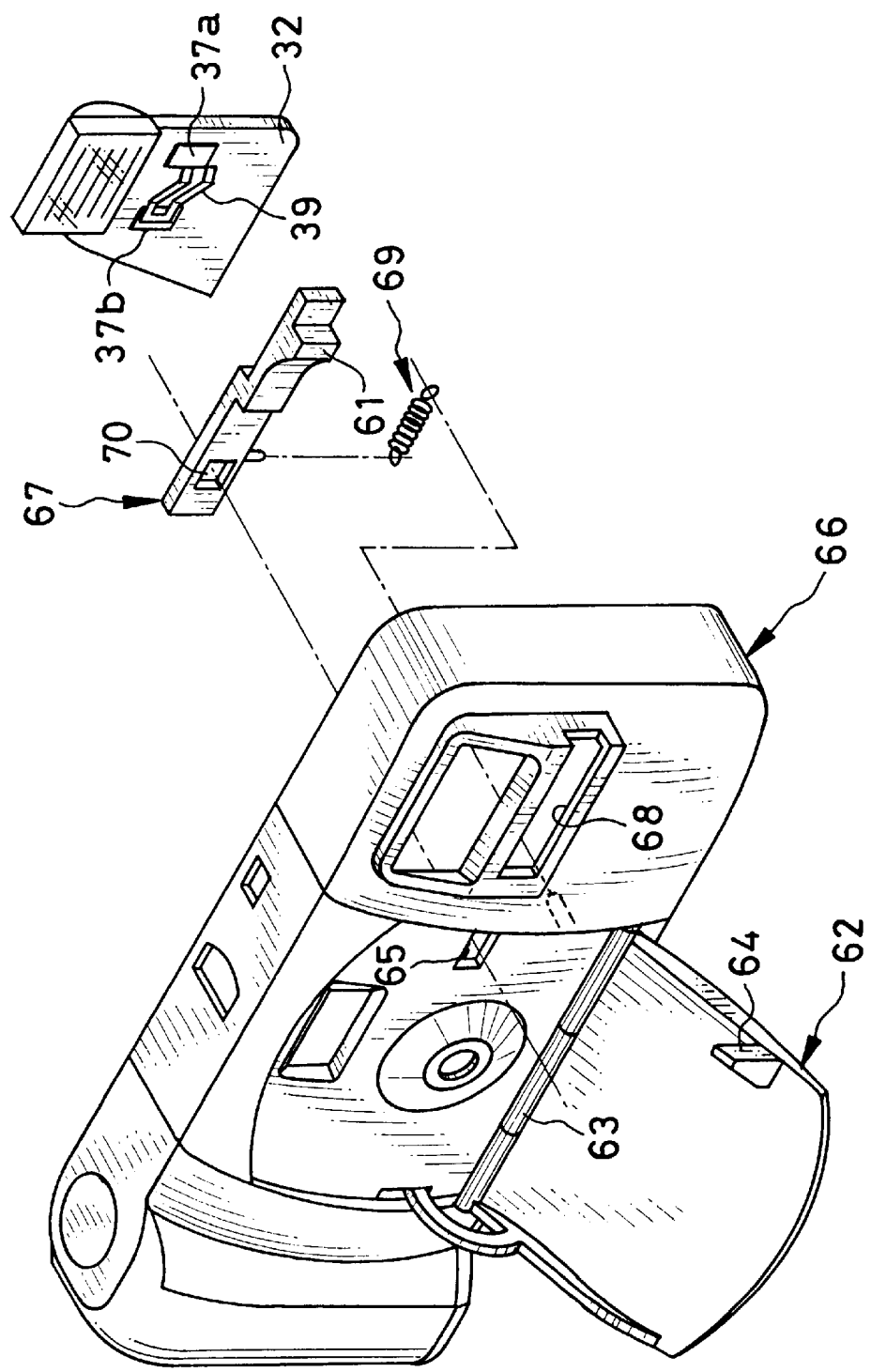
FIG. 9 is an exploded view of a front cover unit of the film unit of FIG. 7, illustrating an interconnection mechanism between the protective cover and the flash switch operation member.

As shown in FIG. 9, a horizontally elongated switch plate 67 is mounted in between the front cover 66 and a flash circuit board 32, so as to be slidable in the horizontal direction of the film unit 60. The flash switch knob 61 is formed integrally with the switch plate 67, and is exposed through an opening 68 that is formed through the front cover 66. A flash switch consisting of a pair of contact chips 37a and 37b and a resilient contact plate 39 is mounted on the flash circuit board 32 behind the switch plate 67. According to the second embodiment, the contact chips 37a and 37b are arranged horizontally to each other, and the contact plate 39 is secured to the contact chip 37b near the middle area.

Figure 10A:
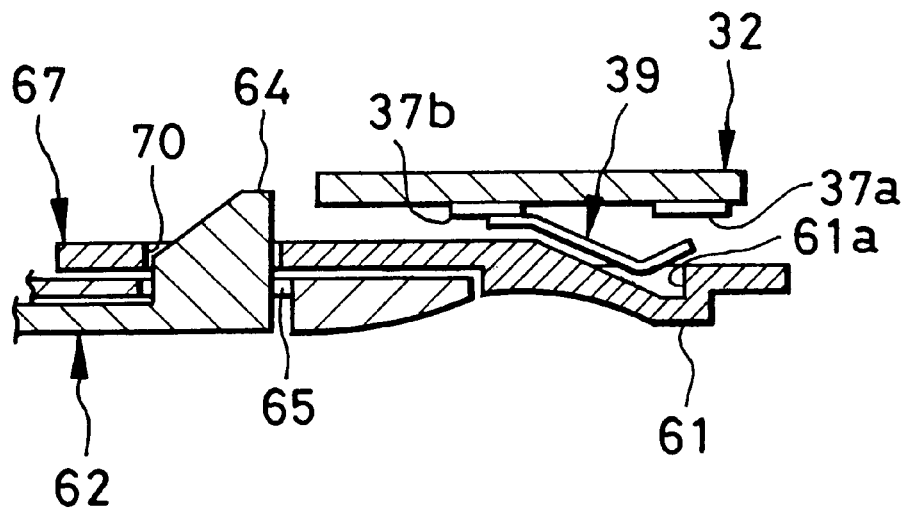
FIGS. 10A and 10B are explanatory views illustrating operations of the interconnection mechanism shown in FIG. 9.

When the switch plate 67 and thus the flash switch knob 61 are in an OFF position shown in FIG. 7, a free end of the contact plate 39 fits in a recess 61a of the switch plate 67, so the contact plate 39 stays off the contact chip 37a, as shown in FIG. 10A. By sliding the flash switch knob 61 to the right of the drawings into an ON position shown in FIGS. 8 and 10B, the switch plate 67 pushes the contact plate 39 into contact with the contact chip 37a, turning on the flash switch. A spring 69 is suspended between the switch plate 67 and the front cover 66, to urge the switch plate 67 toward the ON position.

Figure 10B:
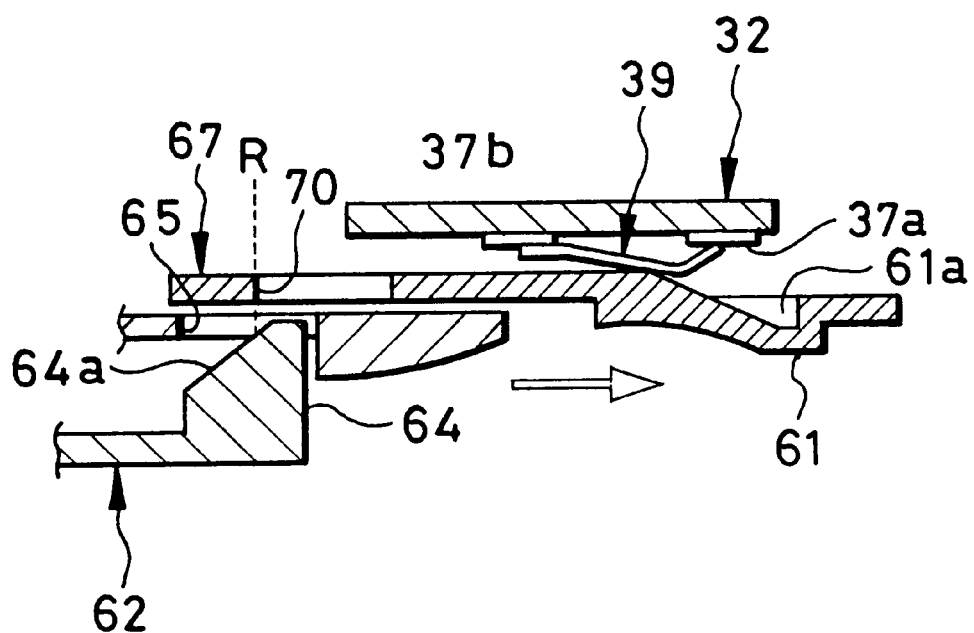

The protective cover 62 has a claw 64 formed on its inner wall by an edge near the flash switch knob 61. When the protective cover 62 is closed, the claw 64 protrudes into the film unit 60 through an opening 65 that is formed through the front cover 66. The switch plate 67 has a hole 70 that is placed behind the opening 65 when the flash switch knob 61 is in the OFF position. Thus, the claw 62 is engaged in the hole 70 of the switch plate 67 through the opening 65 when the protective cover 62 is in the closed position, as shown in FIG. 10A. Thereby, the switch plate 67 is held in the OFF position against the urging force of the spring 69 while the protective cover 62 is closed. By opening the protective cover 62, the switch plate 67 automatically moves to the ON position according to the force of the spring 69.

Where the switch plate 67 is in the ON position, the hole 70 partly overlaps the opening 65 of the front cover 66 such that a trailing edge R of the hole 70 in the sliding direction of the switch plate 67 toward the ON position is placed behind the opening 65, as shown in FIG. 10B. The claw 64 is tapered toward the opening 65. A diagonal surface 64a extending diagonally to the inserting direction of the claw 64 into the opening 65 pushes the trailing edge R of the hole 70 when the claw 64 is inserted in the opening 65. As a result, the switch plate 67 is moved toward the OFF position against the urging force of the spring 69. When the protective cover 62 reaches the closed position, the claw 64 engaged in the hole 70, and the switch plate 67 is locked in the OFF position.

Accordingly, the flash switch is automatically turned on by opening the protective cover 62, and is turned off by closing the protective cover 62. If the photographer wants to take a non-flash photography, the photographer pushes the flash switch knob 61 to the OFF position, i.e. to the left of the drawing, and holds the flash switch knob 61 in the OFF position by the left hand finger when pressing a shutter button 16 by the right hand finger.

Although the present invention has been described with respect to the embodiments shown in the drawings, the present invention should not be limited to the above embodiments but, on the contrary, various modification may be possible to those skilled in the art without departing from the scope of appended claims.

For example, the protective cover does not have to cover the finder objective window. The grooves 53 and 54 may be replaced by slots. The click-stop mechanism 46 to 49 may have another construction. It is possible to hinge a protective cover to be rotatable about a vertical axis instead of using the horizontally rotatable hinge 63. It is possible to provide a vertically slidable flash switch operation member in combination with the rotatable protective cover 62. In that case, a switch plate having a flash switch operation member thereon is urged to move to an upper or lower ON position for turning on a flash switch, and has a width to form a hole therethrough in a position corresponding to a claw of the protective cover 62, wherein position of the claw and orientation of a diagonal surface of the claw should be modified appropriately, so as to push down or up the switch plate to an OFF position.

What is claimed is:

1. A lens-fitted photo film unit having a flash unit incorporated therein and a protective cover movable between a closed position covering a taking lens and an open position uncovering the taking lens, the film unit comprising:

a switch operation member manually operable to move between an ON position for turning on a flash switch of the flash unit to start charging a main capacitor of the flash unit, and an OFF position for turning off the flash switch to terminate charging the main capacitor; and an interconnection device interconnecting between the protective cover and the switch operation member, the interconnection device causing the switch operation member to move from the OFF position to the ON position in cooperation with the protective cover moving to the open position, and from the ON position to the OFF position in cooperation with the protective cover moving to the closed position, and locking the switch operation member in the OFF position while the protective cover is in the closed position, the interconnection device disengaging the switch operation device from the protective cover and allowing the switch operation member to be moved between the ON position and the OFF position when the protective cover is in the open position;

wherein the protective cover is rotatable between the open position and the closed position, the switch operation; member is slidable between the ON position and the OFF position and is urged to move to the ON position, and the interconnection member comprises a hole formed integrally with the switch operation member and a claw formed integrally with the protective cover wherein the claw pushes an edge of the hole as the protective cover is moved to the closed position, causing the switch operation member to move to the OFF position against the urging force, and the claw is engaged in the hole when the protective cover reaches the closed position, locking the switch operation member in the OFF position.

2. A lens-fitted photo film unit having a flash unit incorporated therein and a protective cover movable between a closed position covering a taking lens and an open position uncovering the taking lens, the film unit comprising:

a switch operation member manually operable to move between an ON position for turning on a flash switch of the flash unit to start charging a main capacitor of the flash unit, and an OFF position for turning off the flash switch to terminate charging the main capacitor; and an interconnection device interconnecting between the protective cover and the switch operation member, the interconnection device causing the switch operation member to move from the OFF position to the ON position in cooperation with the protective cover moving to the open position, and from the ON position to the OFF position in cooperation with the protective cover moving to the closed position, and locking the switch operation member in the OFF position while the protective cover is in the closed position, the interconnection device disengaging the switch operation device from the protective cover and allowing the switch operation member to be moved between the ON position and the OFF position when the protective cover is in the open position;

wherein the protective cover is slidable between the open position and the closed position, the switch operation member is slidable between the ON position and the OFF position in a direction perpendicular to a sliding direction of the protective cover, and the interconnection device comprises first and second cam portions formed integrally with the switch operation member and a cam follower member formed integrally with the protective cover, the first cam portion extending aslant to the sliding direction of the protective cover, the second cam portion extending in the sliding direction of the protective cover and being continued to the first cam portion, wherein the cam follower member slides along the first cam portion as the protective cover slides between the open position and the closed position, causing the switch operation member to move between the ON position and the OFF position, and is engaged in the second cam portion when the protective cover reaches the closed position, locking the switch operation member in the OFF position.

3. A lens-fitted photo film unit as claimed in claim 2, wherein the interconnection device further comprises a guide cam surface formed integrally with the switch operation member along the first cam portion, for guiding the cam follower member into the second cam portion while the protective cover is moved from the open position to the closed position after the switch operation member is moved to the OFF position.

4. A lens-fitted photo film unit as claimed in claim 3, wherein the cam follower member comprises a cam follower pin formed at a free end of a resilient arm that extends from the protective cover in the sliding direction thereof toward the switch operation member.

5. A lens-fitted photo film unit having a flash unit incorporated therein and a protective cover movable between a closed position covering a taking lens and an open position uncovering the taking lens, the film unit comprising:

a switch operation member having an ON position and an OFF position, the switch operation member completing an electrical circuit so as to charge the flash unit and allow the flash unit to be triggered while in the ON position, the switch operation member opening the electrical circuit so as to prevent charging the flash unit and prevent the flash unit from being triggered while in the OFF position; and an interconnection device interconnecting the protective cover and the switch operation member;

wherein the interconnection device causes the switch operation member to move from the OFF position to the ON position when the protective cover moves from the closed to the open position;

wherein the interconnection device causes the switch operation member to move to the OFF position when the protective cover moves from the open to the closed position;

wherein the interconnection device locks the switch operation member in the OFF position when the protective cover is in the closed position; and wherein the interconnection device allows the switch operation member to be moved between the ON position and the OFF position when the protective cover is in the open position.

6. A lens-fitted photo film unit having a flash unit incorporated therein and a protective cover movable between a closed position covering a taking lens and an open position uncovering the taking lens, the film unit comprising:

means for controlling the flash so that when the flash control means is in an ON position the flash unit is charged and the flash unit may be triggered, and when the flash control means is in an OFF position charging of the flash unit is terminated and the flash unit is prevented from being triggered; and means for interconnecting the protective cover and flash control means so that the flash control means is moved from the OFF position to the ON position when the protective cover moves from the closed to the open position, the flash control means is placed in the OFF position when the protective cover moves from the open to the closed position, the flash control means is locked in the OFF position when the protective cover is in the closed position, and the flash control means is free to move between the ON position and the OFF position when the protective cover is in the open position.

\* \* \* \* \*